July 23, 1946. J. J. KISPERT Re 22,773

CORSET

Filed Oct. 31, 1945

WITNESSES

Geo. M. Maylor

John H. Glacum

INVENTOR

Joseph J. Kispert

BY

Munn, Lidoly, Glacum & Kane

ATTORNEYS

Reissued July 23, 1946

Re. 22,773

UNITED STATES PATENT OFFICE 22,773

CORSET

Joseph J. Kispert, Mount Carmel, Conn.

Original No. 2,367,875, dated January 23, 1945, Serial No. 447,202, June 16, 1942. Application for reissue October 31, 1945, Serial No. 625,935

5 Claims. (Cl. 2—27)

This invention relates to corsets, and has for an object the provision of a construction whereby an inner vest member cooperates with a pair of outer flaps to enable the wearer to more readily adjust the garment to suit her particular needs.

A further object is to provide an inner vest member in a wrap-around garment, which may be fastened to position the garment on the body, and a pair of outer flaps connected to the inner vest member which may be adjusted to more completely control the areas of support and the amount of pressure exerted by the garment in any given area.

A further object is to provide a garment of the type described, which will enable the wearer to provide additional support to portions of the body needing such support without unduly confining other portions thereof.

A still further object is to provide a garment of the class described, which will be light and comfortable to the wearer and which, while giving the desired support, will leave the limbs free to move so that the wearer may sit or work in comfort.

Other objects of the invention will become apparent as the description proceeds.

In the drawing—

Figure 2:
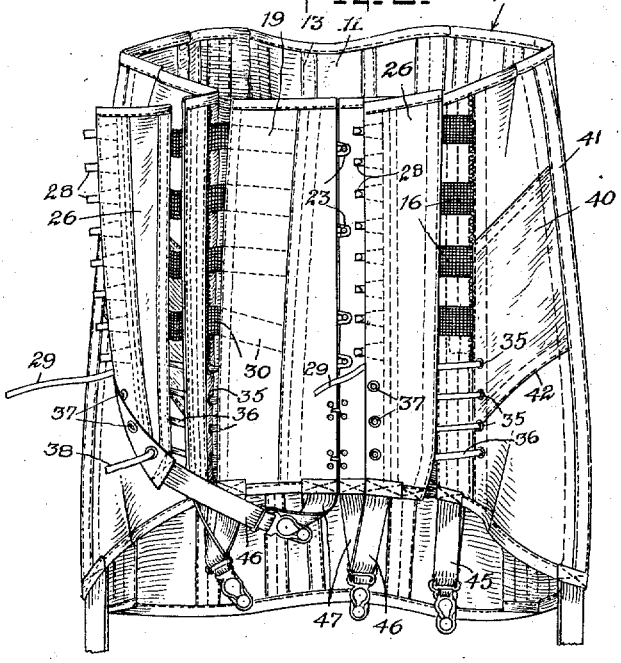
Fig. 2 is an enlarged view showing one of the outer flaps open.
Figure 1:
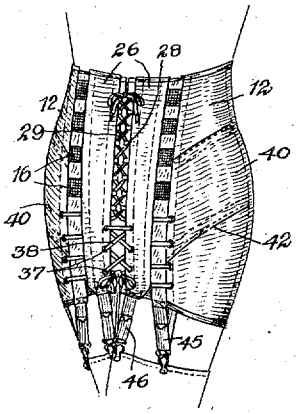
Fig. 1 is a perspective view of my improved corset in position on the body.

The corset body 10 is provided with the usual back 11, side members 12, and may carry conventional stays 13. Toward the front of the garment the side member 12 is provided at its edge with a strengthening member 14 which may include several stays. Within the width of the strengthening member are a plurality of openings 15 adapted to receive the tapes 16 which may be of 1⅛ inch surgical tape, or of any suitable material. The advantage of this construction is that it eliminates the necessity of elastic or rubber portions and results in a firmer and more easily controlled support.

The portion 17 between the openings 15 is sewn with a cross stitch 18 zigzagged over both sections, so that the openings cannot open up and so that the section 17 therebetween will remain flat against the body.

Figure 3:
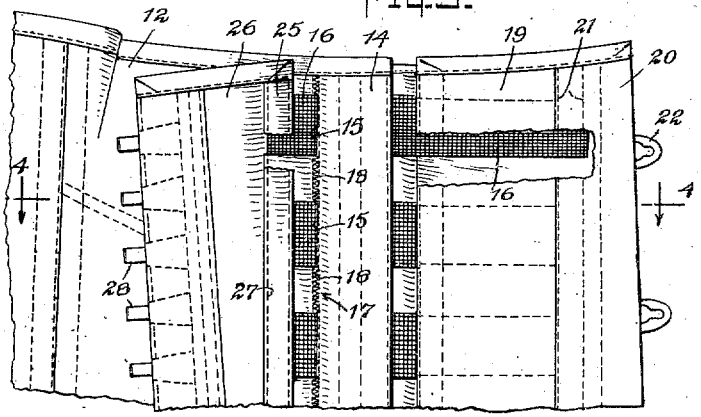
Fig. 3 is an enlarged detail view showing the construction of the tapes connecting the vest member with the outer flaps.
Figure 4:
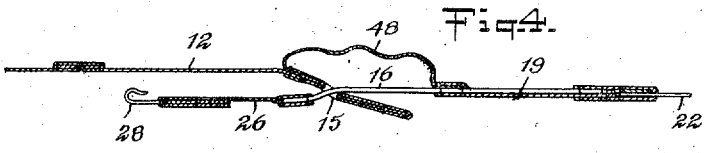
Fig. 4 is a cross-sectional view taken on the line 4—4 of Fig. 3.

One end of the tape 16 is fastened to one side 19 of the inner vest portion and is extended through the inner vest portion, as shown in Fig. 3, to the stiffening member 20 thereof, where it can be fastened by the several lines of stitches 21. The inner vest section 19 is provided with the usual fastening devices 22 adapted to cooperate with corresponding fastening devices 23 on the corresponding inner vest section. The other end of the tape 16, after passing through the opening 15, is fastened to the reinforcing member 25 in the outer flap 26 and held in place by the stitches 27. The lacing hooks 28 may be individually fastened in the edge of the outer flap 26 to cooperate with the laces 29.

A plurality of tapes 16 is used. In my preferred form I show four tapes starting from the top of the garment, the lower tape 30 being curved downwardly to follow the line of the groin, in order that it may tend to lift the abdomen and control the body better. In my improved construction, however, the tapes 16 terminate at the lower groin line.

At the lower portion of the garment below the hip line, a plurality of eyelets 35, preferably four in number, are inserted in the reinforced portion of the side member 12. Through these eyelets a plurality of laces 36 connect the inner vest member 19 and the outer flap 26. Eyelets 37 are provided in the outer flap 26 to receive a flexible lacing 38. The side members 12 may be reinforced by the section 40 running from the edge 41 of the side member to the reinforced section 14 and stitched along all its margins to the side member. The lower edge 42 of the reinforcing section follows the groin line, while the entire section extends over the abdomen. This construction gives additional support to lift the abdomen and hold the abdomen firm and at the same time provides only a single thickness of cloth over the thigh and gives the wearer a breaking line which adds comfort to the wearer when sitting down or doing any type of work. It likewise provides a structure which will fold to the body and not bulge through the outer garments.

In placing the garment on the body the wearer hooks the fastening pieces 22 and 23 and then laces the laces 29 into the lacing hooks 28. It will be noted that the lacing is divided into two sections. The upper lacing starts from the pubic bone and tends to lift the abdomen to put the organs in the correct position in the body. The lower lacing controls and gives firm support over the sacro-iliac, controls the pelvic basin and the section of the corset which extends down over the thigh. Thus it will be seen that the lacings are more or less independent, and it is possible for the wearer to vary the amount of support according to her needs.

Conventional garters 45 may be attached to the corset, and at the front it is preferable that the garters 45 be of double material having one end 46 engaging the outer flap while the other end 47 engages the inner vest. A strip of light material 48 may connect the inner vest 19 and the side member 12 to prevent any possible pinching of the body or distortion of the garment.

Figure 5:
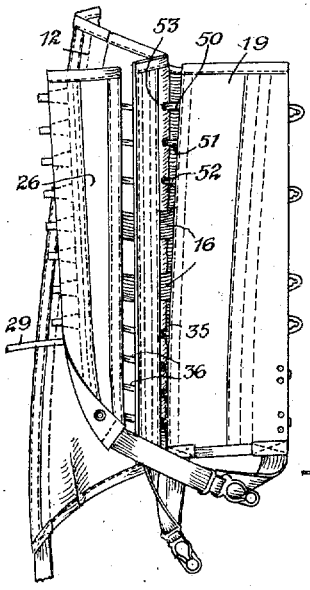
Fig. 5 is a view of a section of the corset with the outer flap thrown back showing a slightly modified form of the invention.

In the modified form shown in Fig. 5, the broad upper tapes are eliminated, and narrow tapes or lacings 50, 51 and 52 fastened through the eyelets 53 are substituted. This modification is adapted to a slightly lighter type of garment where the support of the upper abdomen is not as important, but in other respects functions in the same manner.

I claim:

1. A corset opening at the front, including a back member, side members having reinforced front edge portions and being provided above the wearer's groin line with a series of spaced apertures and therebelow with a series of spaced eyelets, said apertures and eyelets being positioned within the width of the reinforced front edge portions of said side members, inner vest sections provided with complementary disengageable fastening devices, outer flaps overlying the vest sections and provided at their upper portions with lacing hooks and at their lower portions with eyelets, each of said outer flaps being connected to the vest section underlying it at a portion above the groin line by a series of spaced tapes passing through said apertures and extending across the width of the vest section and at a lower portion by a series of spaced laces passing through the eyelets in said side members, and separate laces for cooperation respectively with the lacing hooks and with the eyelets on the outer flaps whereby the corset may be adjusted to the wearer's figure.

2. A corset opening at the front, including a back member, side members having reinforced front edge portions and being provided above the wearer's groin line with a series of spaced apertures and therebelow with a series of spaced eyelets, said apertures and eyelets being positioned within the width of the reinforced front edge portions of said side members, inner vest sections provided with complementary disengageable fastening devices, outer flaps overlying the vest sections and provided at their upper portions with lacing hooks and at their lower portions with eyelets, each of said outer flaps being connected to the vest section underlying it at a portion above the groin line by a series of spaced tapes passing through said apertures and extending across the width of the vest section, the lowest of said tapes following the groin line across the vest section, and at a lower portion by a series of spaced laces passing through the eyelets in said side members, and separate laces for cooperation respectively with the lacing hooks and with the eyelets on the outer flaps whereby the corset may be adjusted to the wearer's figure.

3. A corset opening at the front, including a back member, side members having reinforced front edge portions and being provided above the wearer's groin line with a series of spaced apertures and therebelow with a series of spaced eyelets, said apertures and eyelets being positioned within the width of the reinforced front edge portions of said side members, a reinforcing section stitched along all its margins to each side member and extending upwardly and backwardly from the lower front to the middle rear edge of said side section with its lower edge following the groin line, inner vest sections provided with complementary disengageable fastening devices, outer flaps overlying the vest sections and provided at their upper portions with lacing hooks and at their lower portions with eyelets, each of said outer flaps being connected to the vest section underlying it at a portion above the groin line by a series of spaced tapes passing through said apertures and extending across the width of the vest section, the lowest of said tapes following the groin line across the vest section, and at a lower portion by a series of spaced laces passing through the eyelets in said side members, and separate laces for cooperation respectively with the lacing hooks and with the eyelets on the outer flaps whereby the corset may be adjusted to the wearer's figure.

4. A corset opening at the front and including side members having reinforced front edge portions and being provided above the wearer's groin line with a series of vertically spaced apertures positioned within the width of the reinforced front edge portions of said side members, inner vest sections detachably connected along their front edges, outer flaps for overlying the vest sections, each outer flap being connected with the companion vest section underlying it by a series of vertically spaced tapes extending from its rear edge above the groin line and slidably passing through said apertures and secured to said vest section, a strip of thin fabric secured to each vest section and at its opposite edge to the corresponding side member rearwardly of the corresponding apertures and underlying the apertures and portions of said tapes between the apertures and the vest section to protect the body of the wearer therefrom, and lacings for connecting the front edges of said outer flaps and drawing the flaps toward each other to tighten the corset about a person.

5. The structure of claim 4, wherein portions of the garment between ends of the vertically spaced apertures are sewed with zigzag lines of cross stitching to prevent tearing between the apertures.

JOSEPH J. KISPERT.